US006712365B2

(12) United States Patent
Barinaga et al.

(10) Patent No.: US 6,712,365 B2
(45) Date of Patent: Mar. 30, 2004

(54) OVER-MOLDED GLAND SEAL

(75) Inventors: Louis Barinaga, Salem, OR (US); Daniel D. Dowell, Albany, OR (US); James P. Kearns, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/175,672

(22) Filed: Jun. 20, 2002

(65) Prior Publication Data

US 2002/0158423 A1 Oct. 31, 2002

Related U.S. Application Data

(63) Continuation of application No. 09/662,693, filed on Sep. 15, 2000, now abandoned.

(51) Int. Cl.[7] .................................................. F16J 3/00

(52) U.S. Cl. ........................ 277/628; 277/651; 277/654; 277/626; 220/359.3; 220/359.4

(58) Field of Search ........................... 220/359.3, 359.4, 220/254.1, 780; 277/591, 596, 602, 608, 614, 616, 626, 627, 628, 651, 654

(56) References Cited

U.S. PATENT DOCUMENTS

| | | | |
|---|---|---|---|
| 3,775,832 | A | 12/1973 | Werra |
| 4,218,080 | A | 8/1980 | Kendrick |
| 5,634,567 | A | 6/1997 | Hekal |
| 5,848,717 | A | 12/1998 | Bosl et al. |
| 6,173,969 | B1 | 1/2001 | Stoll et al. |
| 6,308,961 | B1 | 10/2001 | Kunikane et al. |

*Primary Examiner*—Anthony Knight
*Assistant Examiner*—E Peavey

(57) ABSTRACT

An over-molded gland seal for producing both a fluidic seal and a fluid conduit. The apparatus includes a substrate having an elastomeric layer over-molded thereon and an elastomeric gland seal molded into the over-molded layer. Another aspect of the apparatus includes a host-part having a raised wall thereon, said host-part receives the elastomeric gland seal and compresses the gland seal with the raised wall. The substrate, the gland seal, and the host-part define an enclosed region. To form the fluid conduit, the apparatus includes a fluid inlet port and a fluid outlet port that communicate with the enclosed region.

14 Claims, 8 Drawing Sheets

OVER-MOLDED GLAND SEAL

RELATED APPLICATION

This application is continuation of U.S. patent application No. 09/662,693, OVERMOLDED GLAND SEAL, filed Sep. 15, 2000, now abandoned, assigned to the assignee of the present invention.

FIELD OF THE INVENTION

The present invention generally relates to gasket seals for fluids and, more particularly, the present invention has application in creating fluidic seals in the ink delivery systems for ink jet printing systems.

BACKGROUND OF THE INVENTION

In general there are two types of gasket seals in use today to seal fluids within mechanical systems—compressive seals and gland seals. A compressive seal is a flat gasket that is compressed between two mechanical parts. These seals are physically “sandwiched” between the parts by a mechanical joint and typically use face seals between the gasket and each of the parts. A common example of a compressive seal is the head gasket on an internal combustion engine. On the other hand, a gland seal, such as an O-ring, is a seal that utilizes a mismatch in the size of two parts to create a compressive force for sealing. An example of a gland seal is an O-ring placed on a cylinder that is pressed into a hole. The mismatch between the diameter of the cylinder plus the annular thickness of the O-ring and the inside diameter of the hole compresses the O-ring and produces a seal.

The disadvantages of compressive seals are well known. Compressive seals must be continuously subjected to a compressive force, i.e., continuous loading. Further, the gasket itself over time takes on a “compression set” which, in turn, causes the mechanical joints to loosen up. In addition, relaxation of the compressive force can cause the seal to leak.

Gland seals, as well, have their disadvantages. They are very difficult to incorporate into applications other than circular shapes. For any complex geometrical shape or for an elongate shape, i.e., a shape with a large aspect ratio, a compressive seal is typically used. Also, during the assembly of parts, gland seals are difficult to handle and since one gasket is required for each seal, the part counts are high.

Over-molding is a well known, two step, fabrication process in which a rigid substrate is first formed, typically by injection molding. Thereafter, in a second step a layer of elastomer is molded onto the substrate typically by thermoset or thermoplastic injection molding.

Two overmolding methods are commonly used. The first is used for overmolding onto rigid thermoplastics. In this process, a ridge thermoplastic piece is molded. A thermoplastic elastomer is then overmolded after a section of movable coring is retracted. The thermoplastic part may be required to endure high mold temperatures during the second step of this process.

The second method of overmolding is used to overmold thermoset elastomer onto either a rigid thermoset or thermoplastic piece. In this process, a rigid piece (thermoset or thermoplastic) is molded using traditional injection molding techniques. The part is then transferred to a second mold cavity wherein the thermoset elastomer is injected onto it. Again, the rigid piece may endure high mold temperatures during the overmold process.

In the past shaped layers of elastomer with under cuts and overhangs have been uncommon because when the part is removed, the mold either tears the elastomer overhang off the elastomer layer or tears the entire elastomer layer off the substrate. Secondly, it has been found that if the elastomer overhang is compressed during assembly, there has been difficulty in supporting it and preventing it from being squashed by the mechanical joint.

There is also a continuing need in manufacturing for parts that are lower cost, easier to handle, and require fewer critical tolerances. Further, there is a need for assembled components that have lower part counts and are easier to assemble. Lastly, there is an ongoing need for robust fluidic seals and ink conduits for the ink delivery systems in ink jet printing systems. In these printing systems the seals serve as both mechanical bonds for holding assemblies together and seals for containing ink.

Thus, it will be apparent from the foregoing that although there are some well known fluid sealing techniques and fluid conduit systems, there is still a need for an approach that combines the beneficial aspects of both gland seals and compressive seals.

SUMMARY OF THE INVENTION

Briefly and in general terms, an apparatus for producing a fluidic seal according to the present invention includes a rigid substrate having an elastomeric layer over-molded thereon and an elastomeric gland seal molded into the over-molded layer. Another aspect of the apparatus according to the invention includes a rigid host-part having a raised wall thereon, said host-part receives the elastomeric gland seal and compresses the gland seal with the raised wall.

Further, an apparatus for producing a fluid conduit according to the present invention comprises a rigid substrate having an elastomeric layer over-molded thereon; an elastomeric gland seal molded into the over-molded layer for producing a fluidic seal; and a rigid host-part having a raised wall thereon, said host-part receives the elastomeric gland seal and compresses the gland seal with the raised wall. The substrate, the gland seal, and the host-part define an enclosed region. The apparatus also includes a fluid inlet port and a fluid outlet port that communicate with the enclosed region.

Other aspects of the invention will become apparent from the following detailed description, taken in conjunction with the accompanying drawings, illustrating by way of example the principles of the invention.

DESCRIPTION OF THE PREFERRED EMBODIMENTS

Figure 1:
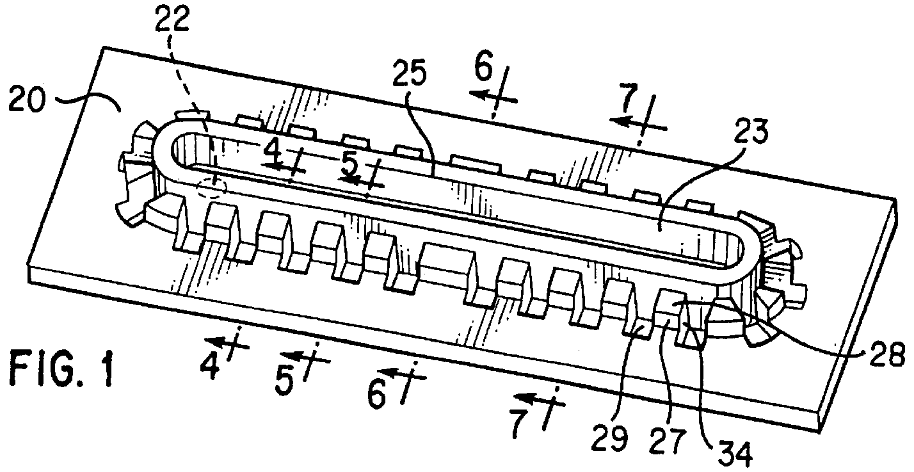
FIG. 1 is a perspective view of a rigid substrate of an apparatus for producing a fluidic seal embodying the principles of the invention.

As shown in the drawings for the purposes of illustration, the invention is embodied in an over-molded gland seal that can produce both a fluidic seal and a fluid conduit.

Referring to FIG. 1, reference numeral 20 indicates a substrate that is rigid and formed from a polymer material such as liquid-crystal polymer (LCP) available from Ticona, Inc. of Summit, N.J. The substrate is formed by conventional injection molding techniques. Located in the wall of the substrate is an inlet port 22 for the fluid that flows through the apparatus after assembly and during operation. The inlet port 22 communicates with a fluid channel 23 formed by a raised wall 25 on the substrate. The raised wall partially defines the fluid channel which is elongate, having more length than width, i.e., a large aspect ratio.

In FIG. 1, located around the outside surface of the raised wall 25 is a plurality of castellations 27 molded into the substrate 20. Each castellation has the shape of a regular parallelepiped and has an upper shoulder surface 28. The upper shoulder surface 28 supports the gland seal, prevents the gland seal from being squashed down during mating, and holds it in position during operation. Further, located between each of the castellations 27 is an aperture 29. Each aperture penetrates completely through the substrate 20 and anchors the gland seal in position.

Figure 2:
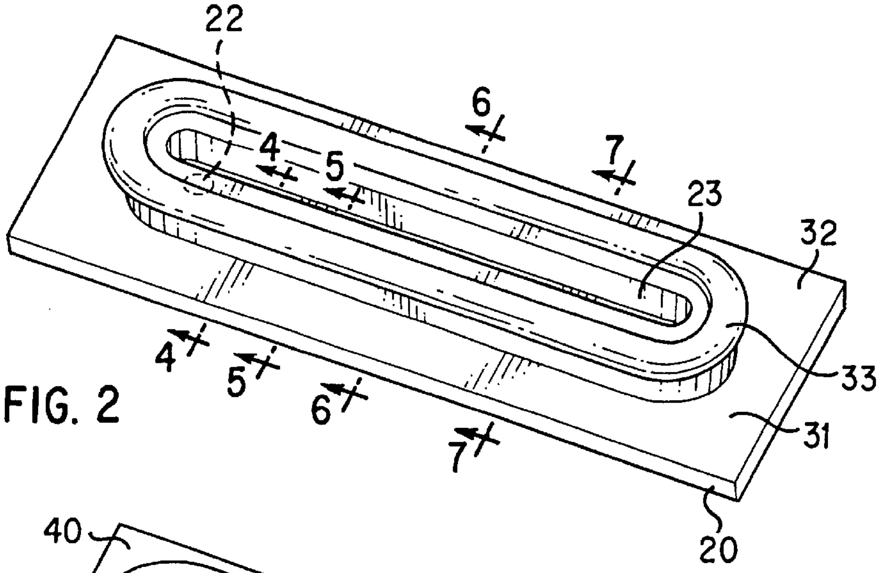
FIG. 2 is a perspective view of the rigid substrate of FIG. 1 with an elastomeric layer over-molded thereon and with an elastomeric gland seal molded into the over-molded layer.
Figure 4:
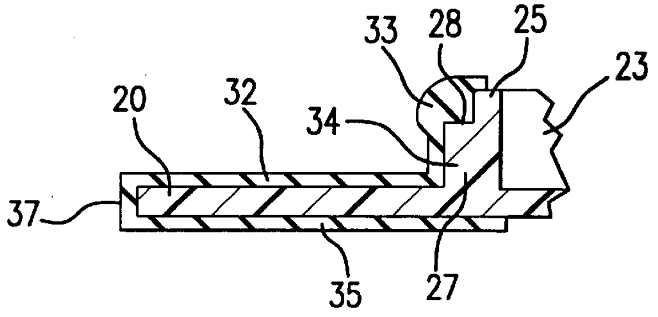
FIG. 4 is an end elevational view, in section and partially cut away, of the apparatus of FIG. 2 taken along lines 4—4 in FIGS. 1 and 2.
Figure 5:
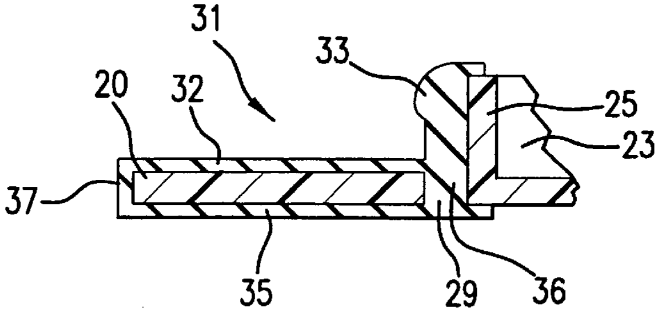
FIG. 5 is an end elevational view, in section and partially cut away, of the apparatus of FIG. 2 taken along lines 5—5 in FIGS. 1 and 2.

Referring to FIGS. 2, 4, and 5, reference numeral 31 generally indicates an over-molded layer of elastomer. The over-molded layer is molded onto the substrate 20 by conventional molding processes. In the preferred embodiment the layer is fabricated from silicone rubber. The over-molded layer includes a planer portion 32 and an elongated toroidal portion that forms a gland seal 33. As illustrated in FIGS. 4 and 5, the toroidal portion 33 has a circular cross section and, as illustrated in FIG. 2, completely surrounds the raised wall 25, FIG. 1 in an elongated, closed curve. As illustrated in FIG. 4, the gland seal 33 is supported vertically by the shoulder surface 28 of each castellation 27. The shoulder surfaces also prevent the gland seal from being squashed down onto the planer portion 32 of the over-molded layer 31 when the parts are assembled. The side walls 34 of each castellation 27 support the gland seal 33, prevent horizontal motion of the gland seal 33 (as illustrated in FIG. 4) when the parts are assembled and provide increased surface area onto which the over-molded layer can adhere.

Referring to FIG. 5, located below the substrate 20 and over-molded thereon is a second elastomeric layer 35. The second over-molded layer 35 is fabricated from the same material and is molded in the same manner and at the same time as the upper over-molded layer 31. The two over-molded layers 31, 35 are seamlessly connected together through the apertures 29 by a plurality of webs 36 of elastomeric material. The two over-molded layers 31, 35 and the webs 36 form a plurality of integral anchors around the substrate 20 through the apertures 29. As illustrated in FIG. 5, the second over-molded layer 35 extends beyond the margins of the apertures 29, and the anchors have the shape of and function like flanges. Orthogonal to the view illustrated in FIG. 5, the anchors are cinctures and completely encircle the substrate 20 through the adjacent apertures 29. If the parts are separated from each other after being mated, the second over-molded layer 35 anchors the gland seal 33 in place, operates as either a flange or a cincture, and prevents the gland seal 33 from being pulled away from or separated from the substrate 20.

It should be appreciated that for clarity the over-molded sidewalls 37 of the part are not illustrated in FIGS. 2, 9,12 and 18 although they are illustrated in FIGS. 4–7 inclusive and are present in all embodiments where there is a second over-molded layer.

Referring to FIG. 5, the gland seal 33 has a circular cross section that over hangs the web 36. In other words, the gland seal extends horizontally (as illustrated in FIG. 5) beyond the vertical external surface of the web, thereby forming an under cut. To prevent the mold, not shown, that forms the gland seal 33 and the web 36 from either tearing the gland seal off the web or tearing the entire upper elastomer layer off the substrate 20 when the part is removed after fabrication of the over-molded layer 31, the diameter of the gland seal, the horizontal dimension of the web, the compressibility of the gland seal, the number of apertures and the extent that the second over-molded layer 35 extends beyond the margins of the apertures 29 are each empirically adjusted.

In one over-molded gland seal actually constructed, the critical parameters and dimensions were:

Material: Silicone rubber

Durometer: 70 shore A

Diameter of gland seal: 0.93 mm

Horizontal dimension of the web: 0.60 mm

Compressibility of the gland seal: 29% diametral compression

Figure 3:
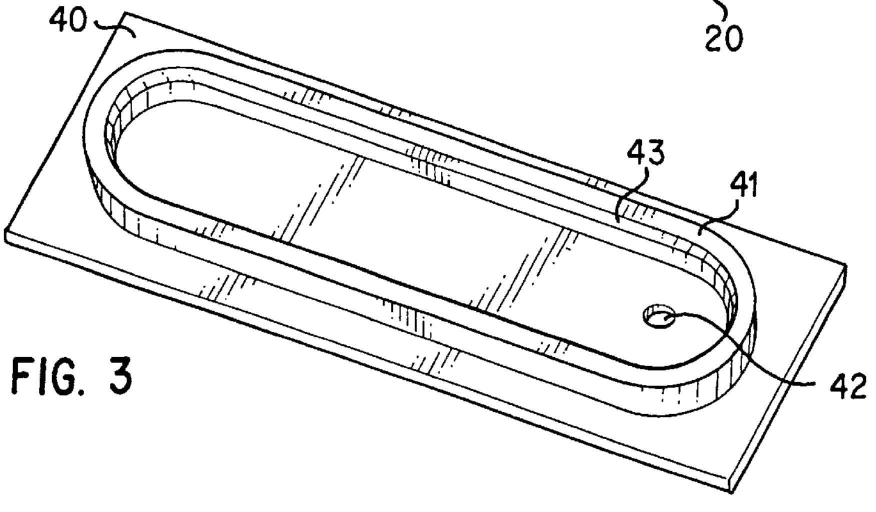
FIG. 3 is a perspective view of a rigid host-part that receives the apparatus of FIG. 2.

In FIG. 3 reference numeral 40 indicates a host-part that mates with the over-molded layer 31 and substrate 20 illustrated in FIG. 2. The host-part is rigid and formed from a polymer material such as LCP. The host-part is formed by conventional injection molding techniques. The host-part has a raised wall 41 on its surface and a outlet port 42 that communicates with the fluid channel 23 defined by the raised wall 25 on the substrate 20 after the parts have been assembled. The inside surface of the raised wall has a bevel 43 that facilitates assembly of the two parts.

Figure 6:
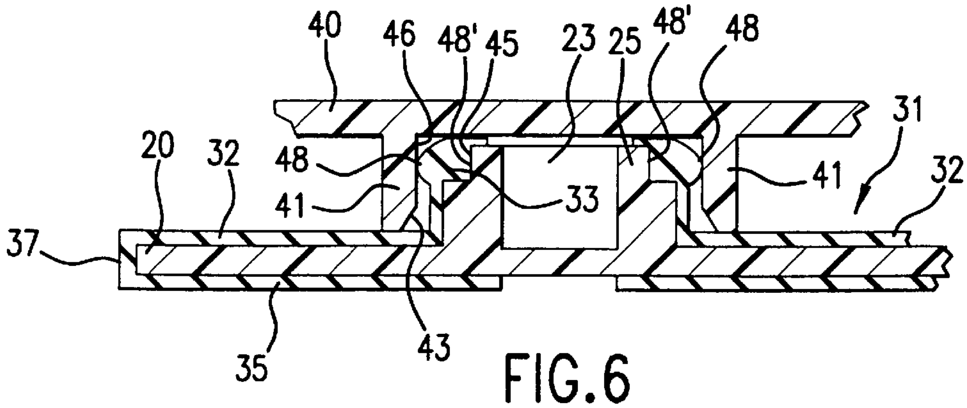
FIG. 6 is an end elevational view, in section and partially cut away, of the apparatus of FIG. 2 taken along lines 6—6 in FIGS. 1 and 2 and the host-part of FIG. 3 after the apparatus and host-part have been mated together.
Figure 7:
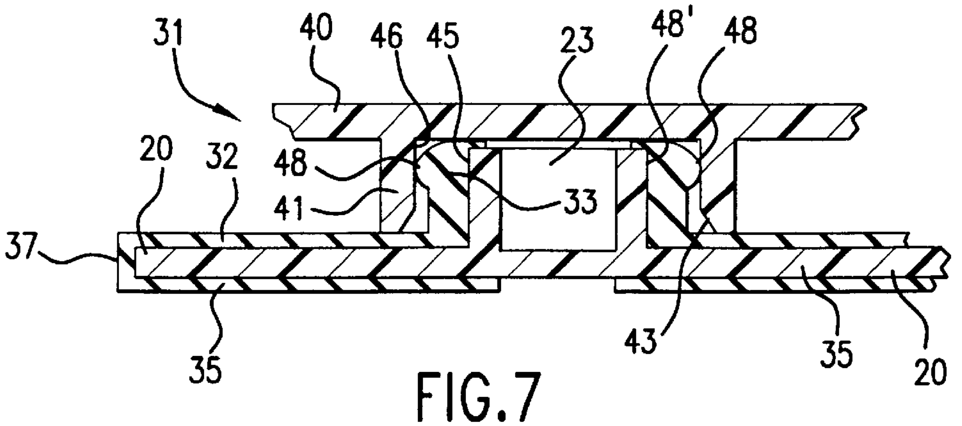
FIG. 7 is an end elevational view, in section and partially cut away, of the apparatus of FIG. 2 taken along lines 7—7 in FIGS. 1 and 2 and the host-part of FIG. 3 after the apparatus and host-part have been mated together.

Referring to FIGS. 6 and 7, when the host-part 40 is slipped over the raised wall 25 of the over-molded part, the bevel 43 progressively compresses the gland seal 33. Next, the gland seal 33 is compressed between the outside surface 45 of the raised wall 25 of the substrate 20 and the inside surface 46 of the raised wall 41 of the host-part 40. This compression occurs because of the mis-match between the diameter of the gland seal and the gap between the outside surface 45 of the raised wall 25 and the inside surface 46 of the raised wall 41 of the host-part 40. The fluidic seal is made at the two surfaces indicated by reference numerals 48, 48'.

The two opposed sealing surfaces 48 illustrated in FIGS. 6 and 7 are loaded in a radial or "in-plane" manner so that the loads are mutually opposed in the plane of the seal. In other words, after assembly, the resultant seal forces are not trying to force the parts to separate; rather, there is a net resultant force of zero orthogonal to the plane of the sealing surface.

In operation, after the parts have been mated as illustrated in FIGS. 6 and 7, fluid enters the apparatus through the inlet port 22, flows through the fluid channel 23, and exits the apparatus through the outlet port 42. The fluid channel is an enclosed region defined by the substrate 20, the gland seal 33, and the host-part 40. The sealing surface of the enclosed region is the surface indicated by reference numeral 48.

It should be appreciated that the inlet port and the outlet port to the apparatus can be in either part as well as both being on the same part. The only requirement is that both ports must communicate with the fluid channel 23.

Further, it is contemplated that a substrate with a continuous shoulder or a ledge around the outside wall of the raised wall 25, FIG. 1, can be used to support the gland seal, and the apertures and castellations can be eliminated.

Figure 8:
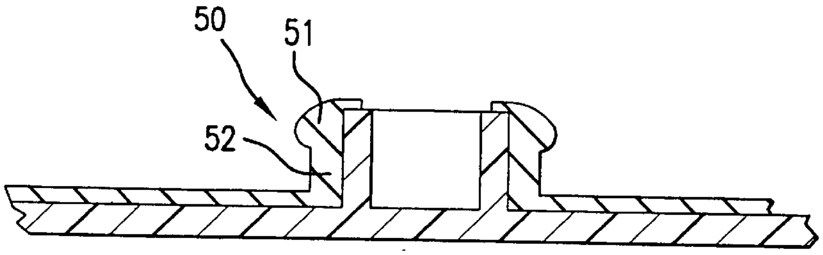
FIG. 8 is an end elevational view, in section and partially cut away, of an alternative apparatus for producing a fluidic seal embodying the principles of the invention.

Referring to FIG. 8, reference numeral 50 generally indicates a gland seal apparatus that incorporates no shoulders, no castellations, no apertures and no anchoring with another surface. The web 52 is sufficiently thick and the gland seal 51 sufficiently compressible to mate and seal with a host-part such as the one described above. If the parts are intended to be disassembled and reassembled, then the over-molded layer must have sufficient adhesion to the substrate both to survive ejection from the mold and to avoid being separated from it upon disassembly.

Figure 9:
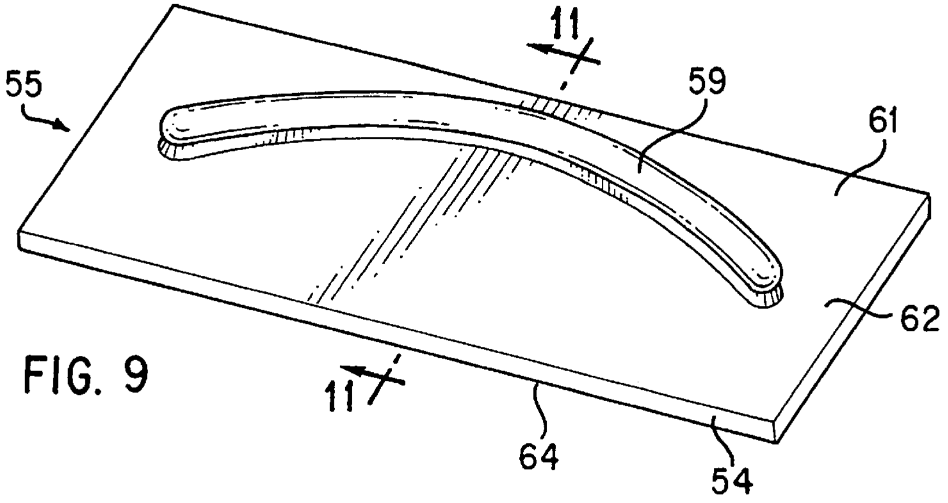
FIG. 9 is a perspective view of a second alternative apparatus for producing a fluidic seal embodying the principles of the invention.
Figure 10:
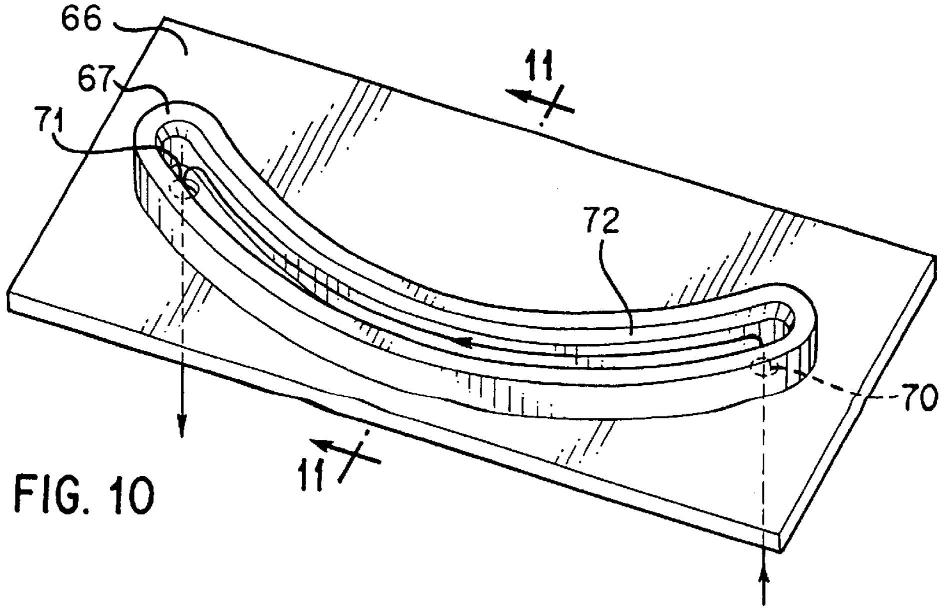
FIG. 10 is a perspective view of a host-part for the apparatus of FIG. 9.
Figure 11:
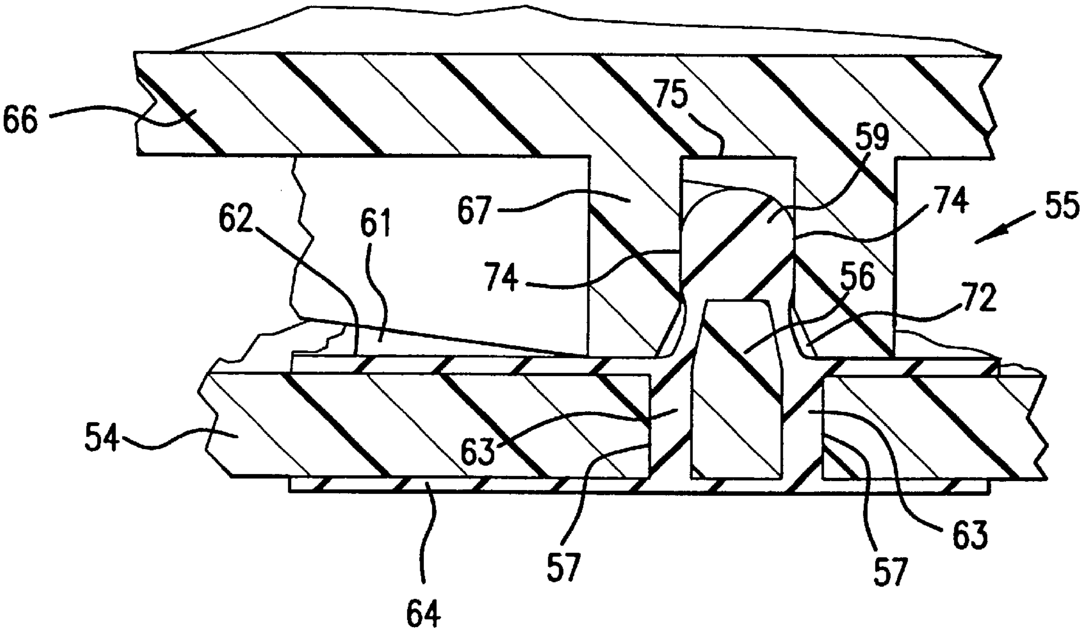
FIG. 11 is a perspective view, in section and partially cut away, of the apparatus of FIG. 9 taken along line 11—11 and the host-part of FIG. 10 taken along line 11—11 after the apparatus and host-part have been mated together.

Referring to FIGS. 9, 10, and 11, reference numeral 55 generally indicates a gland seal apparatus having an elongate arcuate shape, elongate meaning having more length than width. The apparatus 55 includes a rigid substrate 54 that is fabricated from LCP by conventional injection molding techniques. Located on the substrate 54 is a raised wall 56 that can be either continuous or castellated depending on the need to reduce the wall thickness of the substrate. Like the other raised wall 25, FIG. 4, this raised wall 56 supports the gland seal 59 and prevents the gland seal from being squashed down during mating. In addition, located on both sides of the raised wall 56 is a plurality of apertures 57 that penetrate through the substrate 54.

Referring to FIGS. 9 and 11, reference numeral 61 indicates an over-molded layer of elastomer. The over-molded layer is molded onto the substrate 54, is fabricated from the same material as described above, and is molded in the same manner. The over-molded layer includes a planer portion 62 and an arcuate portion that forms a gland seal 59. The arcuate portion 59 has a circular cross section but is not a closed surface like the elongated toroid described above. As illustrated in FIG. 11, the gland seal 59 is supported vertically by the raised wall 56 in the same manner as described above.

Referring to FIG. 11, located below the substrate 54 and over-molded thereon is a second elastomeric layer 64. The two over-molded layers 61, 64 are seamlessly connected together through the apertures 57 by a plurality of webs 63 of elastomeric material to form a plurality of integral cinctures around the substrate 54 through the apertures 57. It should be appreciated from FIG. 11 that the two webs 63, 63' are seamlessly connected together by the second elastomeric layer 64 so that a secure anchor completely encircling the raised wall 56 is formed for the gland seal 59. In other words, a cincture. This cincture is in addition to the cinctures formed between the adjacent apertures on one side of the raised wall 56 and on the other side.

In FIGS. 10 and 11, reference numeral 66 indicates a host-part that mates with the elongate arcuate gland seal illustrated in FIG. 9. This host-part is manufactured from the same materials as described above and in the same manner. The host-part 66 has a raised wall 67 on its surface, an inlet port 70, and an outlet port 71. The inside surface of the raised wall has a bevel 72 that facilitates assembly of the parts.

Referring to FIG. 11, when the host-part 66 is slipped over the gland seal 59, the two inside, opposing surfaces of the raised wall 67 compress the gland seal. The fluidic seal is made at the surfaces indicated by reference numeral 74.

In operation, after the parts have been mated as illustrated in FIG. 11, fluid enters the apparatus through the inlet port 70, flows through a fluid channel 75, and exits the apparatus through the outlet port 71. The fluid channel is an enclosed region defined by the gland seal 59 and the host-part 66. In contrast to the fluid channel 23, FIGS. 6 and 7, the fluid channel 75 is defined in part by the surface of the gland seal 59 located between the two sealing surfaces 74 acting as a principal wall of the fluid channel.

Although the elongate fluid conduit described immediately above is arcuate with an arcuate longitudinal axis, other configurations are contemplated to be within the scope of the invention including S-shapes, Z-shapes, U-shapes, and straight /-shapes.

Figure 12:
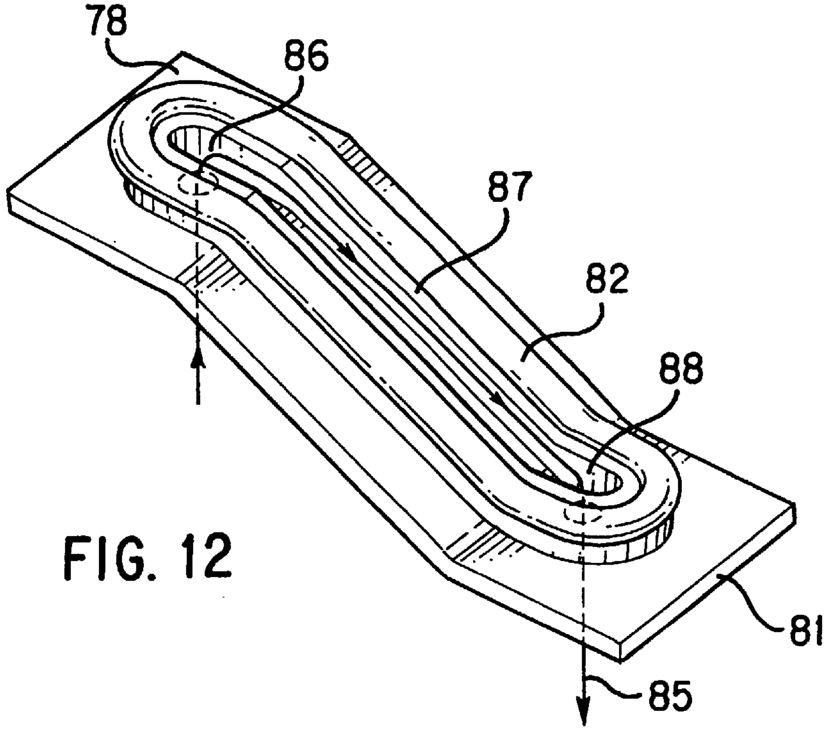
FIG. 12 is a perspective view of a third alternative apparatus for producing a fluidic seal embodying the principles of the invention.
Figure 13:
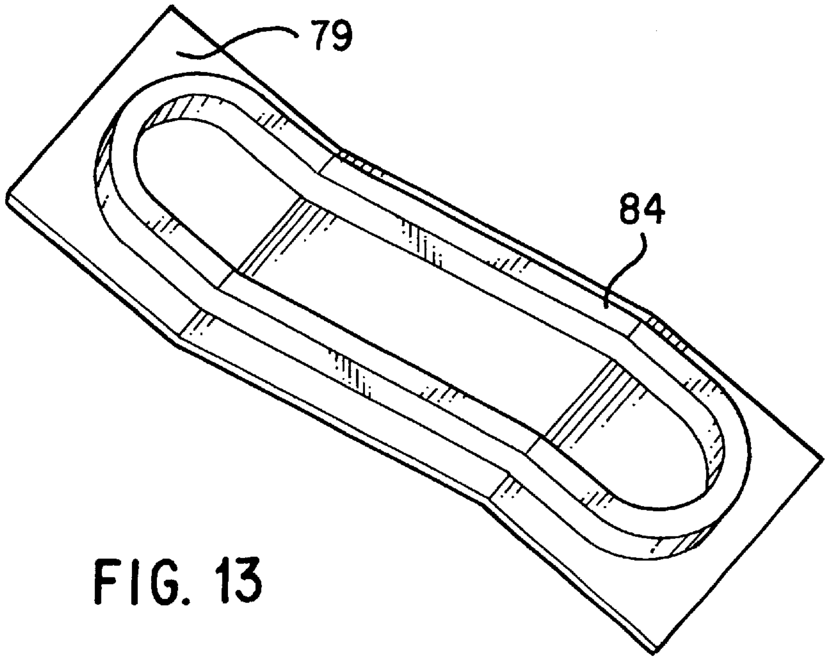
FIG. 13 is a perspective view of a host-part for the apparatus of FIG. 12.

In contrast to the embodiments described above which are all planer or two dimensional, the embodiment illustrated in FIGS. 12 and 13 is multi-planer or three dimensional. Reference numeral 78 indicates a multi-planer gland seal apparatus having a substrate 81 and an over-molded gland seal 82. Reference numeral 79 indicates a host-part for the gland seal apparatus 78, and the host-part 79 has a raised wall 84. Aside from the complex geometry of this embodiment, these parts 78, 79 are fabricated from the same materials and in the same manner and are mated and function in the same manner as the parts described above.

After the gland seal apparatus 78, FIG. 12 and the host-part 79, FIG. 13 are mated, the resulting configuration defines an enclosed region that can operate as a fluid channel or conduit. The direction of flow is indicated by an arrow 85. In FIG. 12 the inlet and outlet ports are not shown because they are obscured by the walls of the gland seal. The fluid channel includes an inlet portion 86, a medial portion 87, and an outlet portion 88 which are all continuous, uninterrupted conduits forming the fluid channel. The plane of fluid flow in the inlet portion 86 of the enclosed region is displaced with respect to the plane of fluid flow in the outlet portion 88 of the enclosed region. In other words the enclosed region has a plurality of portions and the portion of the enclosed region having the inlet port is non-coplanar with the portion of the enclosed region having the outlet port. It is contemplated that the physical displacement between the planes in these portions can be either horizontal, vertical, axial or along any axis in the three dimensions in between. The planes of fluid flow can be either parallel, non-parallel, co-planer or non-coplanar.

Figure 14:
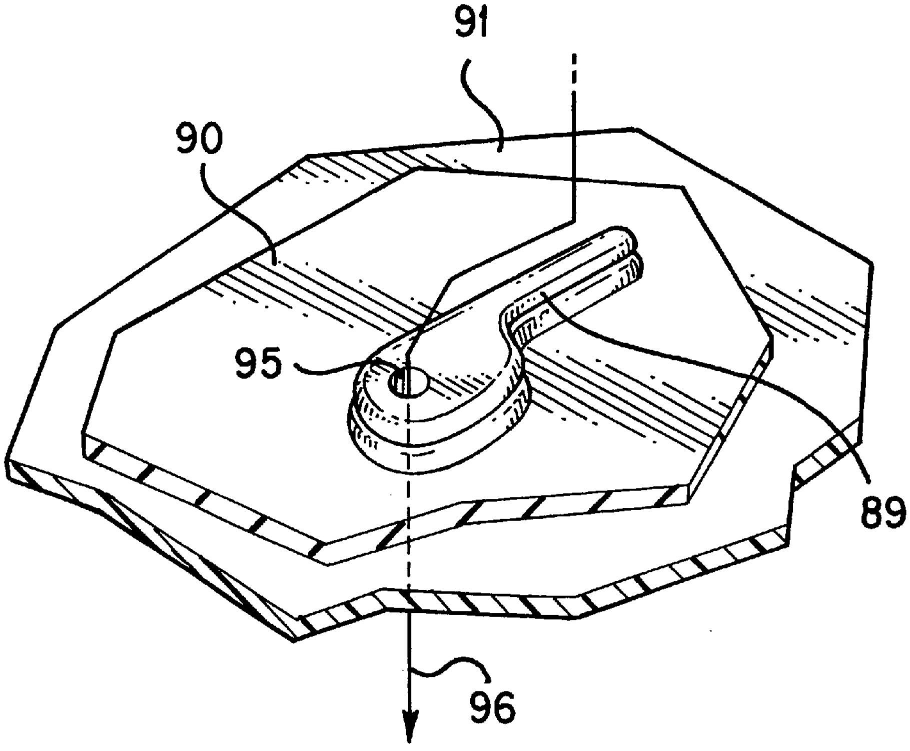
FIG. 14 is a perspective view of a fourth alternative apparatus for producing a fluidic seal embodying the principles of the invention.
Figure 15:
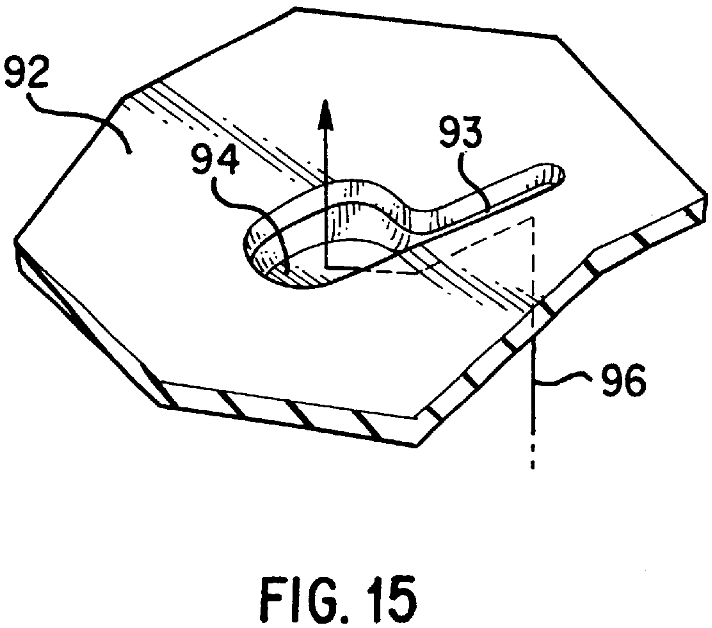
FIG. 15 is a perspective view of a host-part for the apparatus of FIG. 14.

The embodiment illustrated in FIGS. 14 and 15 is a fluid conduit formed by an over-molded gland seal that provides an enclosed region having a complex shape with portions having varying volumes. Reference numeral 90 indicates a gland seal apparatus having a substrate 91 and an over-molded gland seal 89. Reference numeral 92 indicates a host-part for the apparatus 90. These parts 90, 92 are fabricated from the same materials and in the same manner and are mated and function in the same manner as the parts described above.

After the gland seal apparatus 90, FIG. 14 and the host-part 92, FIG. 15 are mated, the resulting configuration defines an enclosed region that can operate as a fluid channel or conduit. The gland seal 89 defines one principal wall of the fluid channel. The fluid channel includes an elongate portion 93 and a plenum portion 94. The elongate portion 93 is constructed and operates in the same manner as the embodiment illustrated in FIGS. 9, 10, and 11. The plenum portion 94 seals in the same manner as illustrated in FIG. 11 and provides an enclosed region having decreased fluid flow velocity and lower pressure. The direction of fluid flow is indicated by an arrow 96; however, the flow can go in either direction. In FIG. 15 the inlet port is obscured by the host-part 92. In FIG. 14 the outlet port is indicated by reference numeral 95 and communicates through the gland seal 89.

Figure 16:
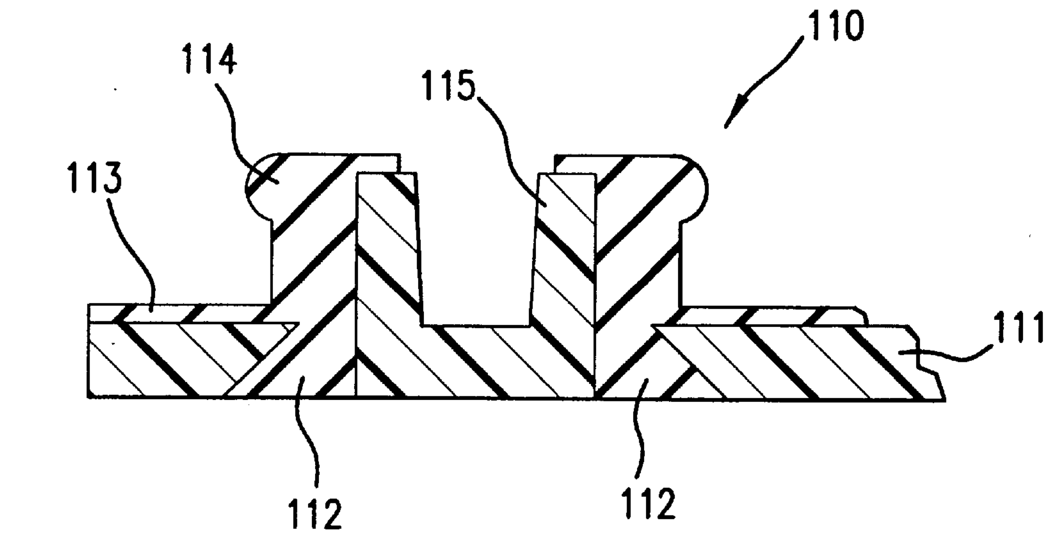
FIG. 16 is an end elevational view, in section and partially cut away, of a fifth alternative apparatus for producing a fluidic seal embodying the principles of the invention.

Referring to FIG. 16, reference numeral 110 generally indicates an over-molded gland seal that does not require either a web or a flange to secure the seal in place. The apparatus includes a rigid substrate 111 that is fabricated from the same material and in the same manner as described above. The substrate is illustrated with two apertures 112 that penetrate through the substrate although in practice a plurality of apertures is formed in the substrate. The apparatus 110 further includes an over-molded elastomeric layer 113 that is fabricated from the same material and in the same manner as described above. An elastomeric gland seal 114 is molded into the over-molded layer 113 as described above. Each aperture 112 inwardly tapers or narrows down in the direction of the gland seal 114. In other words, the apertures 112 in the substrate 111 are molded with an under cut and are filled with the same elastomer that forms the gland seal 114. If the gland seal 114 is pulled away from the substrate 111, i.e., upward as illustrated in FIG. 16, the elastomer in the under cut secures the seal in place.

It should be appreciated, however, that the apparatus 110, FIG. 16, could also be molded with either a web or a flange operatively connected to a second over-molded layer in the manner described above. Such an addition would provide even more support for the gland seal 114.

Figure 17:
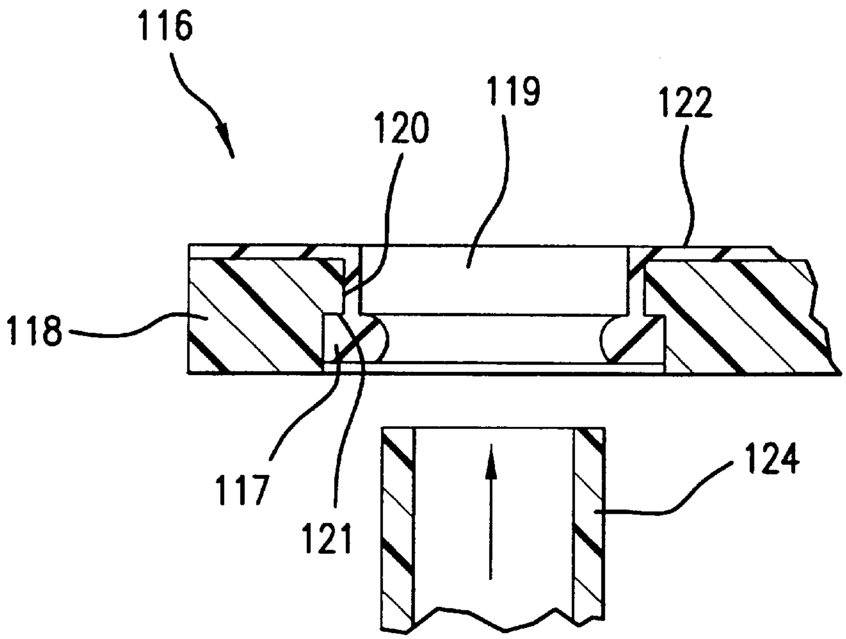
FIG. 17 is an end elevational view, in section and partially cut array, of a sixth alternative apparatus for producing a fluidic seal embodying the principles of the invention.

Referring to FIG. 17, reference numeral 116 generally indicates an apparatus with an internal gland seal 117. The apparatus includes a substrate 118 having an opening 119 with an interior wall 120. Located in the interior wall 120 is an annular wall 121 that supports the gland seal 117. The gland seal is over-molded on the interior wall 120 along with an over-molded layer 122 on the substrate 118. The gland seal 117, the substrate 118, and the over-molded layer 122 are fabricated from the same materials and in the same manner as described above. Reference numeral 124, indicates a host piece that, when inserted into the opening 119 in the apparatus 116, compresses the gland seal 117 and produces a fluidic seal. The annular wall 121 supports the gland seal during the process of insertion of the host piece 124.

It should be appreciated that the opening 119, FIG. 17, in the apparatus 116 may be circular, elliptical, rectangular, triangular, or any other geometrical shape as long as the host piece 124 is received in the opening and forms a fluidic seal with the gland seal 117.

Figure 18:
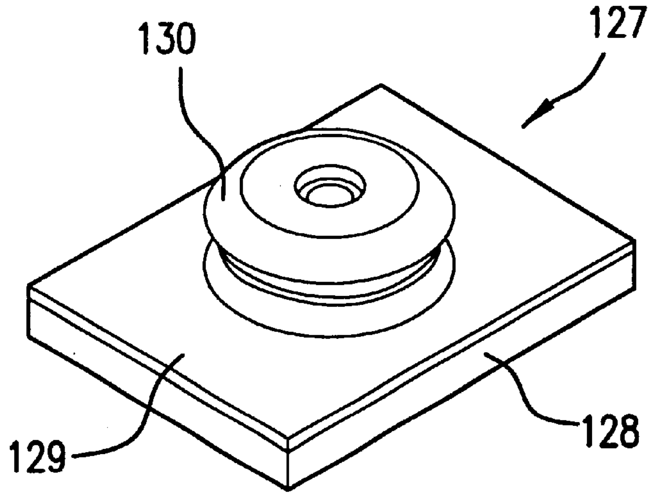
FIG. 18 is perspective view, partially cut away, of seventh alternative apparatus for producing a fluidic seal embodying the principles of the invention.

Referring to FIG. 18, reference numeral 127 generally indicates an apparatus for producing a fluidic seal with an O-ring shaped seal 130. The apparatus includes a rigid substrate 128 on which is over-molded an elastomeric layer 129. The seal 130 is in the shape of a conventional O-ring and is molded into the elastomeric layer 129. The apparatus is fabricated from the same materials and in the same manner as described above. Likewise, the operation of the apparatus with a host piece is as described above.

Figure 19:
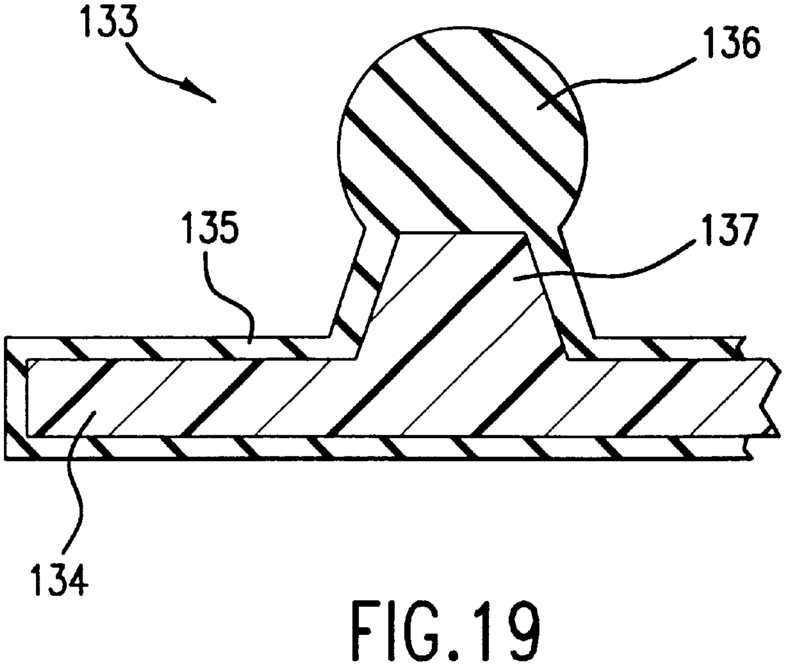
FIG. 19 is an end elevational view, in section and partially cut away, of an eight alternative apparatus for producing a fluidic seal embodying the principles of the invention.

Referring to FIG. 19, reference numeral 133 generally indicates an apparatus for producing a fluidic seal in orifices, holes, and openings. The apparatus includes a rigid substrate 134 on which is over-molded an elastomeric layer 135. The seal 136 has the shape of sphere and is supported by a raised wall 137. The apparatus is fabricated from the same materials and in the same manner as described above. In operation the apparatus plugs openings in host pieces.

The apparatus described herein offers multiple advantages. The apparatus inherently reduces part count. The gland seal is attached to the part directly, and the part arrives at the assembly line with the gland seal securely in position on the part prior to assembly. The apparatus can be used to form both complex geometric seals and elongate seals with very large aspect ratios while still using a gland-like structure. Over-molding allows for multiple seals to be formed on a single substrate where in the past each seal required a separate part. The cost of a single over-molded part, in most cases, is less than the sum of the costs of the individual components. Because the seal is created using a molding process, closer position tolerances for the sealing surfaces are achievable. Assembly tolerances from gasket loading and placement are eliminated. Since the sealing surfaces are created by a mold, the positions of the sealing-surfaces are not affected by dimensional variations in the host part. Further, since the apparatus produces seals between parts, more alternative mechanical joining techniques for the parts are available. The seals are loaded in a radial or "in-plane" manner so the loads are mutually opposing in the plane of the seal. In other words, after assembly, the resultant seal forces are not trying to force the assembly apart; rather, there is a net resultant force of zero orthogonal to the plane of the sealing surface. Also, because the seal is created by an elastomeric material, the design of the seal and the design of the substrate can each be optimized for their different functions. That is to say, the over-mold material can be optimized for sealing and over-molding and the substrate can be optimized for mechanical joining. Lastly, the apparatus permits the over-molded part and the host part to be assembled and disassembled without degrading the efficacy of the seal.

Although specific embodiments of the invention have been described and illustrated, the invention is not to be limited to the specific forms or arrangement of parts so described and illustrated. The invention is limited only by the claims.

We claim:

1. An apparatus for producing a complex fluidic channel comprising:

a substantially rigid substrate having an elastomeric layer over-molded thereon;

an elastomeric gland seal molded into the over-molded layer;

a substantially rigid host-part having a raised wall thereon, said host-part receiving the elastomeric gland seal and compressing the gland seal with the raised wall, thereby producing a fluidic seal;

the substrate, the gland seal, and the host-part defining a complex enclosed region, a fluid inlet port and a fluid outlet port each communicating with the enclosed region;

wherein the complex enclosed region comprising a plurality of fluidically interconnected portions having varying volumes;

and wherein the substrate has a castellation therein, said castellation having a shoulder which supports the gland seal.

2. An apparatus for producing a complex fluidic channel comprising:

a substantially rigid substrate having an elastomeric layer over-molded thereon;

an elastomeric gland seal molded into the over-molded layer;

a substantially rigid host-part having a raised wall thereon, said host-part receiving the elastomeric gland seal and compressing the gland seal with the raised wall, thereby producing a fluidic seal;

the substrate, the gland seal, and the host-part defining a complex enclosed region, a fluid inlet port and a fluid outlet port each communicating with the enclosed region;

wherein the complex enclosed region comprising a plurality of fluidically interconnected portions having varying volumes;

and wherein the substrate has an aperture therein and second elastomeric layer over-molded on the substrate, said two over-molded layers being connected together through the aperture by a web of elastomeric material.

3. The apparatus of claim 2 wherein the web of elastomeric material function as a flange.

4. The apparatus of claim 2 wherein the substrate has a second aperture therein, said two over-molded layers being connected together through the second aperture by a second web of elastomeric material both, said webs being connected together by the second elastomeric over-molded layer.

5. The apparatus of claim 4 wherein the two web encircle the substrate forming a cincture.

6. An apparatus for producing a complex fluidic channel comprising:

a substantially rigid substrate having an elastomeric layer over-molded thereon;

an elastomeric gland seal molded into the over-molded layer;

a substantially rigid host-part having a raised wall thereon, said host-part receiving the elastomeric gland seal and compressing the gland seal with the raised wall, thereby producing a fluidic seal;

the substrate, the gland seal, and the host-part defining a complex enclosed region, a fluid inlet port and a fluid outlet port each communicating with the enclosed region;

wherein the complex enclosed region comprising a plurality of fluidically interconnected portions having varying volumes;

and wherein the substrate has an aperture therein, the aperture Inwardly tapered in the direction of the gland seal and filled with the elastomeric layer, thereby securing the gland seal.

7. An apparatus for Producing a complex fluidic channel comprising:

a substantially rigid substrate having an elastomeric layer over-molded thereon;

an elastomeric gland seal molded into the over-molded layer;

a substantially rigid host-part having a raised wall thereon, said host-part receiving the elastomeric gland seal and compressing the gland seal with the raised wall, thereby producing a fluidic seal;

the substrate, the gland seal, and the host-part defining a complex enclosed region, a fluid inlet port and a fluid outlet port each communicating with the enclosed region;

wherein the complex enclosed region comprising a plurality of fluidically interconnected portions having varying volumes;

and wherein the fluid input port and fluid output port are located in different portions of the complex enclosed region, and the portion of the enclosed region having the inlet port is non-coplanar with the portion of the enclosed region having the outlet port.

8. The apparatus of claim 7, wherein the plane of fluid flow in the inlet portion of the enclosed region is displaced in at least one axis with respect to the plane of fluid flow in the outlet portion of the enclosed region.

9. An apparatus for producing a non-planar fluidic channel, comprising:

a substantially rigid non-planar substrate having an elastomeric layer over-molded thereon;

an elastomeric gland seal molded into the over-molded layer;

a substantially rigid non-planar host-part having a raised wall thereon, said host-part receiving the elastomeric gland seal and compressing the gland seal with the raised wall, thereby producing a fluidic seal;

the substrate, the gland seal, and the host-part defining a non-planar enclosed region, a fluid inlet port and a fluid outlet port each communicating with the non-planar enclosed region; and wherein the substrate has a castellation therein, said castellation having a shoulder which supports the gland seal.

10. An apparatus for producing a non-planar fluidic channel, comprising:

a substantially rigid non-planar substrate having a first elastomeric layer over-molded thereon;

an elastomeric gland seal molded into the over-molded layer;

a substantially rigid non-planar host-part having a raised wall thereon, said host-part receiving the elastomeric gland seal and compressing the gland seal with the raised wall, thereby producing a fluidic seal;

the substrate, the gland seal, and the host-part defining a non-planar enclosed region, a fluid inlet port and a fluid outlet port each communicating with the non-planar enclosed region; and wherein the substrate has an aperture therein and a second elastomeric layer over-molded on the substrate, said first elastomeric layer and said second elastomeric layer being connected together through the aperture by a web of elastomeric material.

11. The apparatus of claim 10 wherein the web of elastomeric material functions as a flange.

12. The apparatus of claim 10 wherein the substrate has a second aperture therein, said two over-molded layers being connected together through the second aperture by a second web of elastomeric material, both said webs being connected together by the second elastomeric over-molded layer.

13. The apparatus of claim 12 wherein the two webs encircle the substrate forming a cincture.

14. An apparatus for producing a non-planar fluidic channel, comprising:

a substantially rigid non-planar substrate having an elastomeric layer over-molded thereon;

an elastomeric gland seal molded into the over-molded layer;

a substantially rigid non-planar host-part having a raised wall thereon, said host-part receiving the elastomeric gland seal and compressing the gland seal with the raised wall, thereby producing a fluidic seal;

the substrate, the gland seal, and the host-part defining a non-planar enclosed region, a fluid inlet port and a fluid outlet port each communicating with the non-planar enclosed region; and wherein the substrate has an aperture therein, the aperture inwardly tapered in the direction of the gland seal and filled with the elastomeric layer, thereby securing the gland seal.

* * * * *

UNITED STATES PATENT AND TRADEMARK OFFICE

CERTIFICATE OF CORRECTION

PATENT NO. : 6,712,365 B2
DATED : March 30, 2004
INVENTOR(S) : Barinaga et al.

It is certified that error appears in the above-identified patent and that said Letters Patent is hereby corrected as shown below:

Column 9,
Line 55, delete “material both,” and insert therefor -- material, both --.

Column 10,
Line 11, delete “Inwardly” and insert therefor -- inwardly --.
Line 14, delete “Producing” and insert therefor -- producing --.

Signed and Sealed this

Seventeenth Day of August, 2004

JON W. DUDAS
*Acting Director of the United States Patent and Trademark Office*